(12) United States Patent
Ackerman et al.

(10) Patent No.: US 6,630,198 B2
(45) Date of Patent: Oct. 7, 2003

(54) METHODS AND APPARATUS FOR WASHING GAS TURBINE ENGINES

(75) Inventors: John Frederick Ackerman, Laramie, WY (US); William Randolph Stowell, Rising Sun, IN (US); Robert Alan Johnson, Simpsonville, SC (US)

(73) Assignee: General Electric Co., Schenectady, NY (US)

( * ) Notice: Subject to any disclaimer, the term of this patent is extended or adjusted under 35 U.S.C. 154(b) by 198 days.

(21) Appl. No.: 09/766,090

(22) Filed: Jan. 19, 2001

(65) Prior Publication Data

US 2002/0096197 A1 Jul. 25, 2002

(51) Int. Cl.⁷ .............................. B05D 7/22; B05D 5/08
(52) U.S. Cl. ................... 427/239; 427/230; 427/388.1; 427/421
(58) Field of Search ............................... 427/230, 239, 427/388.1, 421

(56) References Cited

U.S. PATENT DOCUMENTS

| | | | |
|---|---|---|---|
| 3,623,668 A | * 11/1971 | Freid et al. | 134/22.18 |
| 4,059,123 A | * 11/1977 | Bartos et al. | 134/102.2 |
| 4,196,020 A | 4/1980 | Hornak et al. | |
| 4,713,120 A | 12/1987 | Hodgens, II et al. | |
| 4,834,912 A | 5/1989 | Hodgens, II et al. | |
| 5,273,395 A | 12/1993 | McDermott | |
| 5,725,611 A | * 3/1998 | Wright et al. | 44/375 |
| 5,868,860 A | 2/1999 | Asplund | |
| 6,310,022 B1 | * 10/2001 | Amiran | 134/2 |

* cited by examiner

Primary Examiner—Shrive P. Beck
Assistant Examiner—Kirsten Crockford Jolley
(74) Attorney, Agent, or Firm—Nathan D. Herkamp; Armstrong Teasdale LLP; Robert B. Reeser, III

(57) ABSTRACT

A gas turbine engine wash process that facilitates reducing a formation of particulate matter within a gas turbine engine is described. The engine wash process includes injecting a first liquid into the engine to remove particulate matter formed within the engine and adversely affecting engine operation and performance. A second liquid is then injected into the engine to facilitate reducing a rate of formation of particulate matter within the gas turbine engine as the engine is operated in the future. More specifically, the second liquid is an anti-static liquid that coats compressor blades within the gas turbine engine.

5 Claims, 2 Drawing Sheets

METHODS AND APPARATUS FOR WASHING GAS TURBINE ENGINES

BACKGROUND OF THE INVENTION

This invention relates generally to gas turbine engines, and, more particularly, to methods and apparatus for washing gas turbine engines.

As a gas turbine engine operates, air-borne contaminants may soil and coat compressor blades rotating within a gas turbine engine compressor. More specifically, as the compressor blades rotate, often the blades develop a static charge that attracts electrostatically-charged particles. Over time, particulate accumulation may restrict air flow through the compressor, thus adversely affecting engine performance and degrading power output of the engine.

To facilitate reducing losses caused by such accumulation, gas turbine engines are water-washed when performance is corrupted. Additionally, mechanical cleaning is performed during scheduled engine maintenance shutdown periods. At least some known turbine engine wash systems spray water or a mixture of water and detergent into the engine to remove accumulated particulate matter from the compressor blades. Such water washing systems restore some of the losses, but the gains in engine performance are typically temporary and over time, engine degradation usually continues.

BRIEF SUMMARY OF THE INVENTION

In an exemplary embodiment, a gas turbine engine wash process facilitates reducing a formation of particulate matter within a gas turbine engine. The engine wash process includes injecting a first liquid into the engine to remove particulate matter formed within the engine that may adversely affect engine operation and performance. The engine is then operated to remove liquid residual remaining from the injection of the first liquid and to ensure the engine is thoroughly dried. A second liquid is then injected into the engine to facilitate reducing a rate of formation of particulate matter within the gas turbine engine. More specifically, the second liquid is an anti-static liquid that coats compressor blades within the gas turbine engine to facilitate suppressing static charges from developing within the compressor blades.

During operation of the engine, the anti-static coating applied to the compressor blades facilitates suppressing electrostatic attraction to the blades. Accordingly, particles dependent on electrostatic attraction for attachment to the compressor blades are neutralized and flow through the engine, thus reducing a rate of formation of particulate matter within the engine. As a result, the gas turbine engine wash process facilitates operating performance characteristics of the engine in a cost-effective and reliable manner.

DETAILED DESCRIPTION OF THE INVENTION

Figure 1:
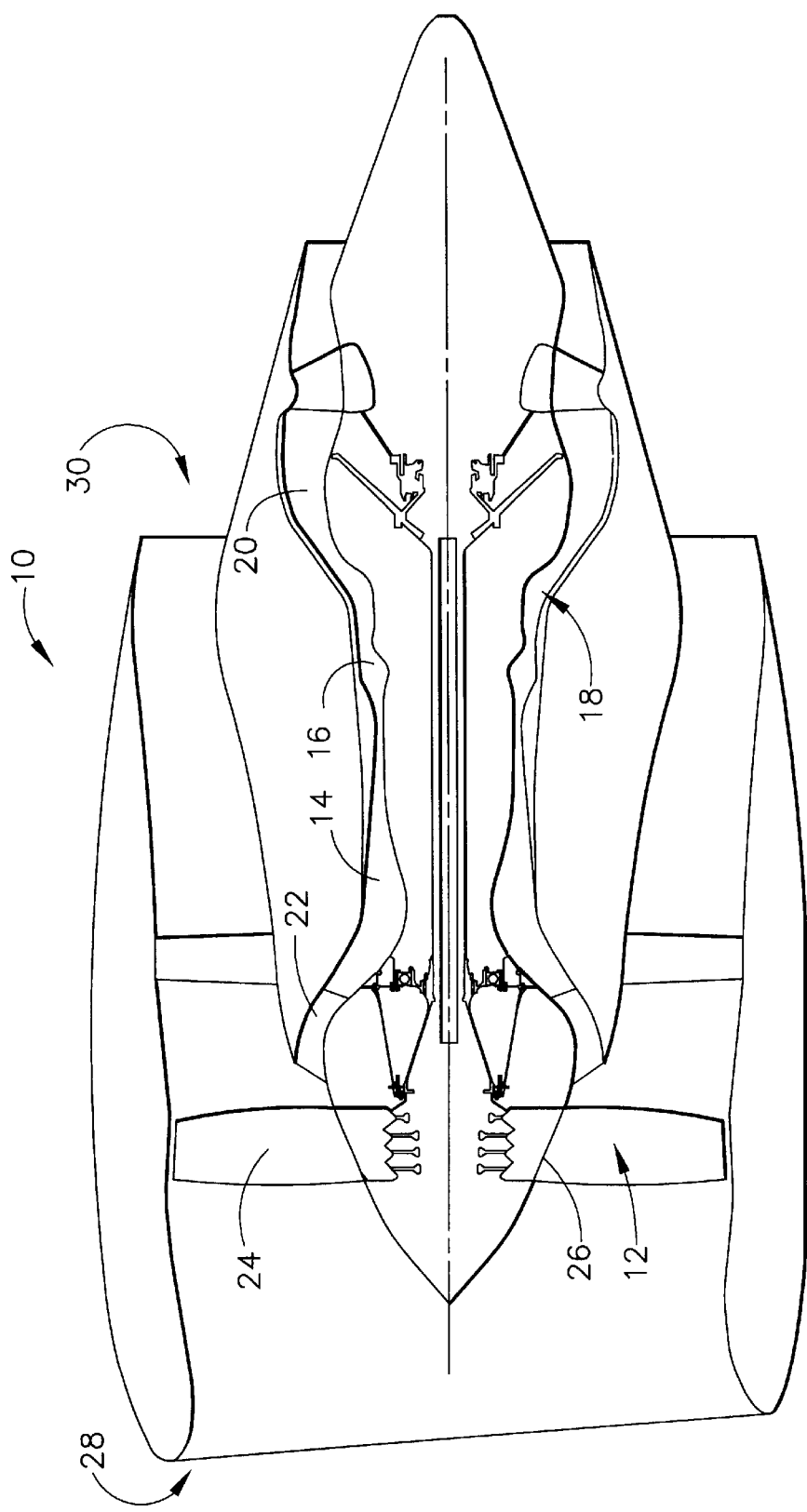
FIG. 1 is a schematic illustration of a gas turbine engine.

FIG. 1 is a schematic illustration of a gas turbine engine 10 including a fan assembly 12, a compressor assembly 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
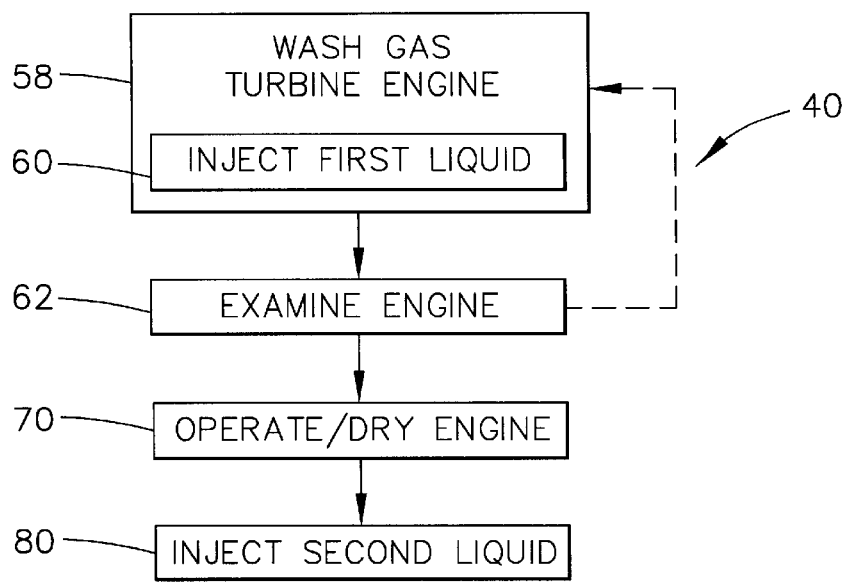
FIG. 2 is a flow chart illustrating an exemplary embodiment of a gas turbine engine wash process.
Figure 3:
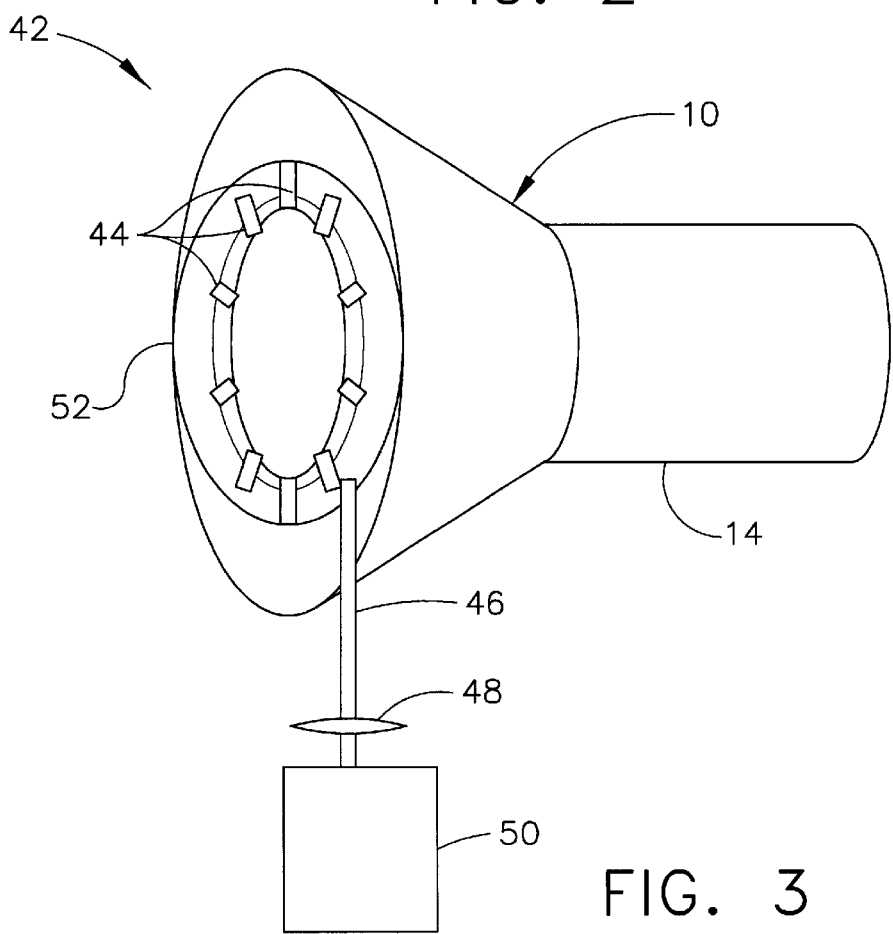
FIG. 3 is a partial perspective schematic of an exemplary embodiment of a gas turbine engine washing system.

FIG. 2 is a flow chart illustrating an exemplary embodiment of a gas turbine engine wash process 40 that may be used with a gas turbine engine, such as gas turbine engine 10 shown in FIG. 1. FIG. 3 is a partial perspective schematic of an exemplary embodiment of a gas turbine engine washing system 42 that may be used to wash a gas turbine engine, such as gas turbine engine 10. Gas turbine engine washing system 42 is known in the art and includes a plurality of spray nozzles 44, a plurality of piping 46, a pump 48, and a reservoir 50. Piping 46 extends between a ring manifold 52 and reservoir 50, and connects nozzles 44 in flow communication with reservoir 50.

In the exemplary embodiment, nozzles 44 are spaced equally in a circumferential row 56 upstream from compressor assembly 14. More specifically, nozzles 44 inject fluid circumferentially radially inward. Nozzles 44 are each coupled in flow communication with ring manifold 52, such that each nozzle 44 discharges a substantially equal volume of water at a substantially equal flow rate. Piping 46 is coupled in flow communication between ring manifold 52 and reservoir 50. More specifically, piping 46 extends from pump 48 to ring manifold 52.

Gas turbine engine 10 is initially washed 58 using gas turbine engine washing system 42. More specifically, gas turbine water washing system 42 is coupled to engine 10 and reservoir 50 is filled with a first liquid. During washing 58 of engine 10, the first liquid is injected 60 into engine 10 to remove soiling and particulate matter from engine 10. In one embodiment, the first liquid is water. In another embodiment, the first liquid is a water-based detergent or cleaning solution. In a further embodiment, the first liquid is water-based surfactant.

When the first liquid is injected 60 into gas turbine engine 10, pump 48 pressurizes the first liquid to transport it through piping 46 from reservoir 50 to ring manifold 52. The first liquid is discharged radially inward from ring manifold 52 through nozzles 44 and into engine 10. In one embodiment, as the first liquid is injected 60, gas turbine engine 10 is rotated with the aid of a starter motor to provide an air flow through engine 10 such that particulate matter dislodged with the first liquid is carried from engine 10 with the air and first liquid flowing through engine 10.

After injecting 60 the first liquid through engine 10, engine 10 is then examined 62 to determine whether a desired level of engine cleanliness was obtained with the initial application of the first liquid. If it is determined that additional particulate matter undesirably remains, additional washing 58 is then performed with the first liquid.

After engine 10 has been washed 58, engine 10 is operated 70 for a pre-determined period of time to remove residual first liquid from engine 10 and to ensure engine 10 is thoroughly dried. A second liquid is then injected 80 into gas turbine engine 10. In one embodiment, gas turbine engine washing system reservoir 50 is drained to remove the first liquid, and then filled with the second liquid. In another embodiment, gas turbine engine washing system reservoir

50 includes a second reservoir (not shown) that is filled with the second liquid.

When the second liquid is injected 80 into engine 10, at least a portion of engine 10 is coated with the second liquid to facilitate reducing a rate of formation of particulate matter within gas turbine engine 10. More specifically, the second liquid coats compressor blades (not shown) within compressor assembly 14 to facilitate suppressing an attraction of electrostatically-attracted particles to the compressor blades. In one embodiment, the second liquid is injected 80 into engine 10 simultaneously with the first liquid, as the first liquid is injected 60 into engine 10.

The second liquid is selected to facilitate optimizing performance of engine 10. More specifically, when the second liquid is selected, several factors unique to engine 10 are considered including, but not limited to, a type of material used in fabricating the compressor assembly blades, a type of air-filtration system (not shown) used with engine 10, and a geographic location of where engine 10 is primarily operated. In one embodiment, the second liquid is a water soluable, anti-static liquid, such as an antistatic agent commercially available from Dongnam Chemical Industries, Ltd., Inchon, Korea.

The above-described gas turbine engine wash process is cost-effective and highly reliable. During operation of the engine, the anti-static coating applied to the compressor blades facilitates suppressing electrostatic attraction of the blades. Accordingly, particles dependent on electrostatic attraction for attachment to the compressor blades are neutralized and flow through the engine, thus reducing a rate of formation of particulate matter within the engine. As a result, the gas turbine engine wash process facilitates operating performance characteristics of the engine in a cost-effective and reliable manner.

While the invention has been described in terms of various specific embodiments, those skilled in the art will recognize that the invention can be practiced with modification within the spirit and scope of the claims.

What is claimed is:

1. A method for washing a gas turbine engine with a washing system, said method comprising the steps of:
    injecting a first liquid into a flowpath extending through the engine to remove particulate matter; and
    injecting a second liquid into the engine flowpath to facilitate reducing a rate of formation of particulate matter within the gas turbine engine by suppressing electrostatic attraction of the blades.

2. A method in accordance with claim 1 wherein said step of injecting a first liquid further comprises the step of injecting a water-based cleaning solution into the turbine engine.

3. A method in accordance with claim 1 wherein said step of injecting a second liquid further comprises the step of injecting an anti-static liquid into the engine.

4. A method in accordance with claim 3 wherein said step of injecting an anti-static liquid further comprises the step of coating a portion of the engine with a water-soluble anti-static liquid to facilitate suppressing electrostatic attraction.

5. A method in accordance with claim 3 wherein said step of injecting an anti-static liquid further comprises the step of operating the engine to dry the engine prior to injecting the second liquid into the engine.

* * * * *